United States Patent
Cross

(10) Patent No.: US 8,882,874 B1
(45) Date of Patent: Nov. 11, 2014

(54) FLEXIBLE, MULTI-CARTRIDGE, RECONFIGURABLE/SELECTABLE AIR CONTAMINANT CONTROL SYSTEM AND METHOD FOR FUEL CELLS

(76) Inventor: Jonathan Cross, Springfield, VA (US)

( * ) Notice: Subject to any disclaimer, the term of this patent is extended or adjusted under 35 U.S.C. 154(b) by 542 days.

(21) Appl. No.: 11/248,619

(22) Filed: Oct. 13, 2005

(51) Int. Cl.
B01D 46/00 (2006.01)
B01D 53/04 (2006.01)

(52) U.S. Cl.
USPC .......... 55/482; 55/481; 55/485; 55/502; 55/506; 96/134; 96/138; 96/417

(58) Field of Classification Search
USPC ........ 55/481–482, 485–487, 529, 350.1, 480, 55/506, 502; 95/90, 286–287; 96/131–132, 134–135, 121, 138, 417
See application file for complete search history.

(56) References Cited

U.S. PATENT DOCUMENTS

| | | | |
|---|---|---|---|
| 2,881,854 A * | 4/1959 | Uehre, Jr. | 96/138 |
| 4,684,380 A * | 8/1987 | Leichnitz | 96/117.5 |
| 5,069,691 A * | 12/1991 | Travis et al. | 96/57 |
| 5,207,812 A * | 5/1993 | Tronto et al. | 55/498 |
| 5,405,528 A * | 4/1995 | Selbie et al. | 210/232 |
| 5,540,617 A * | 7/1996 | Siegel et al. | 454/158 |
| 6,190,432 B1 | 2/2001 | Gieseke et al. | |
| 6,309,769 B1 | 10/2001 | Haug | |
| 6,422,197 B1 * | 7/2002 | Amann et al. | 123/198 E |
| 6,432,177 B1 * | 8/2002 | Dallas et al. | 96/132 |
| 6,497,817 B1 * | 12/2002 | Liang | 210/232 |
| 6,537,347 B2 * | 3/2003 | Motouji et al. | 95/8 |
| 6,585,792 B2 | 7/2003 | Schneider et al. | |
| 6,638,339 B2 | 10/2003 | Dallas et al. | |
| 6,780,534 B2 | 8/2004 | Stenersen et al. | |
| 6,783,881 B2 | 8/2004 | Stenersen et al. | |
| 6,783,882 B2 | 8/2004 | Schmidt | |
| 6,797,027 B2 * | 9/2004 | Stenersen et al. | 55/350.1 |
| 6,894,620 B2 * | 5/2005 | Reinhardt et al. | 340/607 |
| 7,008,465 B2 * | 3/2006 | Graham et al. | 95/78 |
| 7,138,008 B2 * | 11/2006 | Stenersen et al. | 96/134 |
| 7,275,377 B2 * | 10/2007 | Kates | 62/129 |

(Continued)

FOREIGN PATENT DOCUMENTS

WO   WO 02/22234 A2   3/2002

OTHER PUBLICATIONS website: http:/www.engineeredge.com/filtration/cartridge-filters-review.htm.*

(Continued)

*Primary Examiner* — Robert Clemente
(74) *Attorney, Agent, or Firm* — Hunton & Williams LLP

(57) ABSTRACT

A unique, multi-cartridge, easily re-configurable ambient air filter assembly (air contaminant control system) that removes particulate and gaseous chemical/biological contaminants from the incoming cathode air stream on a fuel cell or similar devices is described. The filter assembly is composed of individual filter cartridges (sub-assemblies) of various filtration media that are targeted at removing specific airborne contaminants. Combining specific sets of cartridges enables the filter assembly to be readily/rapidly configured (and re-configured) for specific applications—such as urban, rural, industrial, or military battlefield environments. Selection of correct media ensures complete removal of potential contaminants, enables rapid re-configuration to different environments, quick replacement of spent cartridges without disposal of non-spent media (reducing waste and cost). The invention concept is highly configurable to various sizes and shape fuel cells or other applications requiring clean ambient air by simply scaling the filter assembly size and air flow rates.

20 Claims, 7 Drawing Sheets

(56) References Cited

U.S. PATENT DOCUMENTS

| | | | |
|---|---|---|---|
| 7,449,046 B2* | 11/2008 | Schroeter | 95/21 |
| 7,488,377 B2* | 2/2009 | Schroeter | 96/380 |
| 7,678,180 B2* | 3/2010 | Arthur et al. | 95/273 |
| 2002/0150805 A1* | 10/2002 | Stenersen et al. | 429/34 |
| 2002/0157359 A1* | 10/2002 | Stenersen et al. | 55/350.1 |
| 2002/0189457 A1 | 12/2002 | Dallas et al. | |
| 2003/0064271 A1 | 4/2003 | Stenersen | |
| 2003/0096152 A1 | 5/2003 | Traver | |
| 2004/0023096 A1 | 2/2004 | Pratt et al. | |
| 2004/0065195 A1* | 4/2004 | Gogins | 95/8 |
| 2004/0151966 A1 | 8/2004 | Dahlgren et al. | |
| 2004/0157095 A1* | 8/2004 | Bruck et al. | 429/13 |
| 2004/0237488 A1* | 12/2004 | Stenersen | 55/482 |
| 2005/0022670 A1 | 2/2005 | Dallas et al. | |
| 2005/0031932 A1 | 2/2005 | Hu | |
| 2005/0045552 A1* | 3/2005 | Tadlock | 210/440 |
| 2005/0058873 A1* | 3/2005 | Arthur et al. | 429/34 |
| 2005/0076623 A1* | 4/2005 | Stenersen et al. | 55/350.1 |
| 2005/0208348 A1* | 9/2005 | Canepa | 429/12 |
| 2005/0235615 A1* | 10/2005 | Nyman et al. | 55/350.1 |
| 2005/0262818 A1* | 12/2005 | Stenersen | 55/482 |

OTHER PUBLICATIONS websites: http://www.engineeredge.com/filtration/cartridge-filters-review.htm.*
http://www.engineersedge.com/filtration/cartridge-filter-review.htm.*

* cited by examiner

FLEXIBLE, MULTI-CARTRIDGE, RECONFIGURABLE/SELECTABLE AIR CONTAMINANT CONTROL SYSTEM AND METHOD FOR FUEL CELLS

FIELD OF THE INVENTION

The present invention is related to a multi-cartridge, rapidly re-configurable/modifiable air filtering and contaminant removal system, with the filter assembly constructed of multiple, individually replaceable filtration media which remove a wide variety of particulate, chemical, and biological contaminants. This filter assembly (air contaminant control system) is particularly useful for filtering ambient air used at the cathode (oxidant) side of a fuel cell, when the system is exposed to wide variety of contaminants/conditions. The filter assembly is specifically and uniquely designed to be rapidly re-configured to handle changing or diverse ambient air environments, and to minimize disposal of un-depleted filtration media, thereby reducing cost and increasing flexibility.

BACKGROUND OF THE INVENTION

Despite technological advances in the development of alternative fuels (e.g., nuclear and solar) and the use of hydro-electricity (where geography permits), fossil fuels remain the predominant sources of energy today—especially in the automotive market. The major disadvantages of fuels such as gasoline and diesel are that the available supply is limited and that they release significant amounts of waste products, create health hazards, and damage the ozone layer. For years scientists have sought practical alternative sources of power—and most recently fuel cells have shown significant promise. Although initially discovered in 1839, the fuel cell as a potential, viable power source for commercial, residential, and military applications is a relatively recent development, with the majority of significant advances being made over the past two decades.

As a result, there is considerable optimism that the fuel cell may well be the power source of the future, as it runs relatively cleanly, efficiently, and quietly—especially compared to conventional fossil fuel burning combustion sources (such as internal combustion engines). Fuel cells are devices that electrochemically convert a fuel's chemical energy directly to electrical energy—as opposed to power sources that convert chemical energy to mechanical energy using combustion, then convert mechanical energy to electrical energy using a generator. Among the various types of fuel cells available, the Proton Exchange Membrane fuel cell (PEMFC) appears to have the most promise for commercial vehicle and military use, though recent strides in Direct Methanol Fuel Cells (DMFC), and Solid Oxide Fuel Cells (SOFC) have made them more suitable for niche applications.

A typical PEMFC fuel cell is a device that consists of a proton-permeable electrolyte membrane (often Nafion™, though other membranes are available and being researched) sandwiched between two catalyst-impregnated electrodes (an anode and a cathode). A fuel, such as hydrogen, is supplied to the anode side, where the catalyst strips the electrons from the hydrogen atom (leaving a proton). The electrons flow through an external circuit with a load, producing electricity, while the protons pass through the membrane selectively to the cathode, where it recombines with the electrons and oxygen (typically from ambient air) to produce water and heat as byproducts. Different fuel cell types vary in the types of fuel, the membrane/electrolytes, and operating temperature, but virtually all require oxygen (typically from ambient air) at the cathode side. Some fuel cells use hydrogen directly, while others reform secondary hydrocarbon fuels, such as methanol, ethanol, gasoline, diesel, or natural gas, to produce hydrogen—though these reformers are less efficient and pose significant purification issues to remove contaminants from the hydrogen stream that are harmful to the anode-side of the fuel cell.

It is widely known that atmospheric air contains numerous contaminants, both particulate and chemical. These contaminants may range from large items (e.g., leaves, papers, debris, insects, and horticultural products), to small particulate items down to sub-micron sizes (e.g., dust, pet dander, viruses, spores, pollen, smokes, smog, and aerosols). Chemical contaminants are also widely present in atmospheric air, with sources that range from man-made pollution to products of natural environmental causes. Typical atmospheric contaminants include volatile organic compounds such as methane, butane, propane, and other hydrocarbons, oxides of nitrogen, oxides of sulfur, carbon monoxide, hydrogen sulfide, toluene, formaldehyde, etc. In addition, on the military battlefield a whole range of additional contaminants are prevalent—including carbon dioxide, nitrogen, aluminum oxide, graphite flakes, white/red phosphorous, brass flakes, chemical agents, hydrogen cyanide, and so on.

Traditionally, most of today's internal combustion engines are relatively immune to the effect of these contaminants, with the exception of the large particulates (e.g., leaves, debris, dust), which are easily eliminated by relatively simple air filters (most often simple pleated cloth or metal filters). By nature of their design, extremely fine particles and chemical contaminants are handled easily because of the extreme temperatures during combustion. Although combustion of the chemical contaminants may increase emissions, the internal combustion engines performance is not significantly impacted by their presence in the intake air.

Such is not necessarily the case, however, with fuel cells. Fuel cells by their very nature require a relatively clean oxygen source, typically from ambient atmospheric air. Contaminants in the intake (cathode) air stream can, and have been shown to, significantly degrade the cathode catalyst performance, resulting in poor performance, or even preventing operation of the fuel cell.

Only recently has the importance of clean intake air been recognized, though not universally accepted, as a significant drawback to fuel cells. This has been due, in part, to the fact that most research to date has been focused on the effect of impurities in the fuel source on the performance of the PEMFC. Generally these impurities interfere with the catalysts (e.g., platinum) used to accelerate the reaction. However, very little research has been done on examining the effects of cathode oxygen/air impurities on fuel cell performance. Of those studies that exist only a few chemicals, such as carbon monoxide, nitrogen dioxide, sulfur dioxide, and benzene have been examined or characterized. In experiments conducted last year, it was shown that automotive exhaust pollutants (diesel and gasoline) cause a significant degradation in electrical performance and life expectancy of small PEM Fuel Cells, as much as 0.4 to 8.8% per minute. Also it was demonstrated that a simple filter could reduce the degradation by 26 to 85%—which is clearly still too high to make PEMFCs a practical power source. Moreover, it was demonstrated that multiple cycling of dirty versus clean air resulted in a steady degradation of performance, permanently damaging the fuel cell over time. Clearly, the importance of contaminant free cathode intake air has not been fully recognized for its importance on efficient and optimal operation of fuel cells.

Consequently many fuel cells today are not designed to operate efficiently in the presence of large amounts of contaminants which may be present in the intake air that is necessary for the functioning of the fuel cell. They also have not generally been designed to handle or filter such complex contaminant mixes from the intake air. This probably because fuel cells are relatively new, have been tested primarily in relatively benign laboratory environments (where contaminants are limited), and have not been extensively employed in a variety of realistic environments. Moreover, although significant research has (and is being) done on fuel cells, they are still relatively new, and the full scope of their operational parameters are not well defined or understood.

Development of PEMFCs as a viable power source requires a much more advanced air contaminant control system able to deal with wide range of pollutants found in a variety of ambient air environments—in urban areas, rural farming communities, and in military combat. It is well known that atmospheric contamination concentrations vary widely from place to place. The effects of these contaminant concentration variations are particularly acute in mobile applications, such as cars/trucks, small portable fuel cells, auxiliary power units, where the types of and concentration levels of contaminants may vary significantly. It is critical therefore, that fuel cell systems include a highly flexible, adjustable filtration system that is designed to eliminate harmful contaminants and one that enables the fuel cell to be used and easily adapted to a wide range of operational environments. While some limited work has been done in developing simple air filtration systems for specific applications, little has been done to develop a filtration system (or air contamination control system) that can be easily adapted and re-configured during operation to support multiple contaminant environments.

What is desired, therefore, is a fuel cell that functions within environments having a wide range of contaminants, employing easily, relatively lost cost, replaceable cartridges that are tailored in size and amount of filtration media to remove specific particulate and chemical contaminants.

SUMMARY OF THE INVENTION

The present invention describes a method and specific devices (filter assemblies or air contaminant control system) for highly flexible, rapidly configurable, low cost filter assemblies for filtering intake air at the oxidant or cathode side of fuel cells. The filter assembly conditions the intake air and manages the exposure of the cathode to particulate and chemical/biological gaseous and liquid materials. Although available filtration media are effective individually against specific contaminants, and although filter design is nothing new, the present invention addresses several issues uniquely associated with the practical implementation of fuel cell technology, particularly where the applications are for fuel cells for vehicles and mobile devices (e.g., cell phones, laptops, deployable/mobile generators). Unlike larger, stationary fuel cells, for which the ambient air environment can be easily characterized and custom designed filters developed, these mobile fuel cells, whether generating small (<1 kilowatt) or large (>1 megawatt) amount of power, must be capable of rapidly adapting to a variety of contaminant environments, often changing over relatively short periods of time. All have a need for a continuous supply of contaminant-free oxygen (from ambient air) for the cathode (oxidant) side of the fuel cell. As a result current filtration devices for fuel cells are generally custom tailored and require replacement of the entire assembly if one segment becomes depleted.

The amount and types of contaminants that must be removed from the intake air depends heavily on the environment in which the fuel cell is operating. Fuel cells used in relatively benign environments and which remain in that environment can use custom designed filters specifically tailored to removing the common environment contaminants. Typical applications might include fuel cells used in a fixed location with easily and relatively unvarying pollution levels, such as a residential community or a laboratory. In other cases, where the fuel cell is used in a mobile application (such as in vehicle applications, mobile power generation, or on the military battlefield) where the contaminants in a specific location vary widely by both pollutant type and by concentration, a means for rapidly adjusting/modifying the fuel cell to the current environment with minimal effort and cost is required. Unfortunately, typical filtration devices are custom designed to specific applications and are not easily modifiable by the user should the conditions which originally require a filter change. Filtration devices are often constructed of layers of filtration media to meet very specific anticipated contaminants by type and concentration. They are not easily reconfigured retroactively should the environment change.

Clearly the amount and type of contaminants that must be removed depend greatly on the type of fuel cell being used. The present invention is easily adaptable to any fuel cell, such as PEM, solid oxide, molten carbonate, though because of different operating temperatures and chemistries of these cells the configuration of the media (numbers, size, types) will vary. This is indeed one of the advantages of the present invention, that it can be readily reconfigured at low cost to satisfy the requirements of these fuel cells. In fact, however, this invention has potential applicability to other, non-fuel cell applications where contaminant levels (type and concentration) may vary over periods of time.

Accordingly, the fundamental aspect of this invention is to provide complete filtration of intake air for the fuel cell system, regardless of the type/concentration of contaminants in the ambient air, so long as specific filtration media (physical or chemical) exist to remove each individual contaminant. The filter assembly of the present invention provides not only the particulate filtration and/or chemical/biological filtration of incoming oxidant air streams, but permits that the filtration media be individually replaced when depleted/exhausted or added/removed to meet current environmental contaminants.

The present invention provides highly configurable filter assemblies wherein it enables insertion of multiple filtration media sub-assemblies (cartridges). The filter assembly consists of two different fundamental embodiments—one containing an external housing wherein cartridges are placed, and one in which the cartridges are physically connected, eliminating the need for an external housing. In either embodiment the housing/assembly has an inlet and an outlet, both of which are designed specifically to interface with the design of the fuel cell. The inlet allows dirty air into the filter assembly (either by natural suction of the fuel cell or by use of compressors/pumps specifically designed for the fuel cell (and which are not covered by this invention). The outlet permits purified or clean filtered air to flow from the filter assembly into the fuel cell pump and/or cathode structure.

The core of the filter housing/assembly consists of 1 to N (where N is integer greater than one) individual, separately removable cartridges (term used to generically include all shapes/size of individual containers used to house the filtration media, whether a layer, disk shaped, bubble, or tubular). In a preferred embodiment, the filter assembly permits acceptable gases (gases that do not impact fuel cell operation, such as oxygen or nitrogen) from ambient air) to pass freely to the cathode, but prevents passage of unacceptable particulates and chemical/biological gases—such as carbon monoxide, volatile hydrocarbons, chemical agents, nitrous oxides, sulfurous oxides, and so on. Moreover the filter assembly also manages water vapor concentrations. The content of each individual cartridge is a filtration media that has been selected for removal of one or more specific contaminants. The size, shape, and location of the filter elements are particularly important depending on the air flow rates of the fuel cell supported. The filter assembly typically includes a particulate removal feature, a chemical adsorbent feature, and a water management feature. Individual cartridges may include various particulate filters of metal, foam, or high efficiency particulate arrestance (HEPA) materials designed to reduce particulates from large (leaves) to very small (diesel soot). One or more chemical/biological cartridges may be included, each composed of its own cartridge/container and tailored to a specific chemical or combination of chemicals. Typical configurations might include a desiccant/molecular sieve assembly to manage water vapor, a $MnO_2/CuO$ mixture (commercial known under various names, such as Carulite™) to eliminate carbon monoxide, and a variety of activated carbons (with or without impregnation) to remove chemical/biological gaseous materials.

The filter assembly is constructed and configured in the fuel cell so that oxidant, entering via the intake port, passes through the particulate removal feature and contacts the chemical adsorbent and water management media. The housing or configuration of the device ensures that air flow passes only through the cartridges, in the correct order, that no gases are permitted to escape around the cartridges, and that no external air is permitted to enter.

The invention is significant because by selection the proper combination of cartridge assemblies tailored to remove the specific chemicals/particulates in the operating environment, the filter assembly can be 100% effective, with no degradation of system performance, even under extreme conditions. The flexible, multi-cartridge design makes it simple to rapidly reconfigure (by adding, removing, replacing individual cartridges) the filter assembly for alternative operating environments (with different types/concentrations of contaminants). Moreover, it allows replacement of spent modules/cartridges (preferably using service life indicators) without unnecessarily disposing of the unused materials/chemicals found in a typical layered, integral filter. For example, should a specific contaminant be especially prevalent and deplete one media (e.g., heavy dust/sand), only the depleted filter need be replaced—reducing cost, logistics, and disposal problems. Several of the embodiments allow a high degree of flexibility, in both size and shape, making it simple to integrate with a variety of commercial/military fuel cells. The materials and replaceable cartridges are relatively low cost, improve performance, and reduce disposal problems.

According to one embodiment of the invention, a fuel cell cathode air filter assembly (air contaminant control system) is provided. The assembly comprises: (a) an intake port that collects ambient air and directs it into the filter assembly; (b) a filter assembly consisting of either (i) an air-tight housing containing individual, separate, removable physical and chemical filtration/adsorption media cartridges or (ii) a design such that cartridges are attached directly to one another means without a separate external housing; and (c) an outlet port assembly that connects to the oxidant intake port of the fuel cell or other device that requires clean ambient air.

In another embodiment of the invention, a fuel cell cathode air filter assembly (air contaminant control system) is provided. The assembly comprises intake port means for collecting ambient air and directing it into a filter assembly, wherein the filter assembly comprises (i) an air-tight housing containing individual, separate, removable physical and chemical filtration/adsorption media cartridges, or (ii) at least one or a plurality of cartridges attached directly to one another without a separate external housing; and outlet port means for connecting the filter assembly to an oxidant intake port of a fuel cell or other device that requires clean ambient air.

In yet another embodiment of the invention, a method for constructing a fuel cell cathode air filter assembly (air contaminant control system) is provided. The method comprises the steps of: attaching a filter assembly to an air intake port, the filter assembly consisting of either (i) an air-tight housing containing individual, separate, removable physical and chemical filtration/adsorption media cartridges or (ii) a design such that cartridges are attached directly to one another means without a separate external housing; and attaching the filter assembly to an oxidant intake port of a fuel cell or other device that requires clean ambient air.

Various other embodiments are disclosed and claimed.

DETAILED DESCRIPTION OF EMBODIMENT

Figure 1:
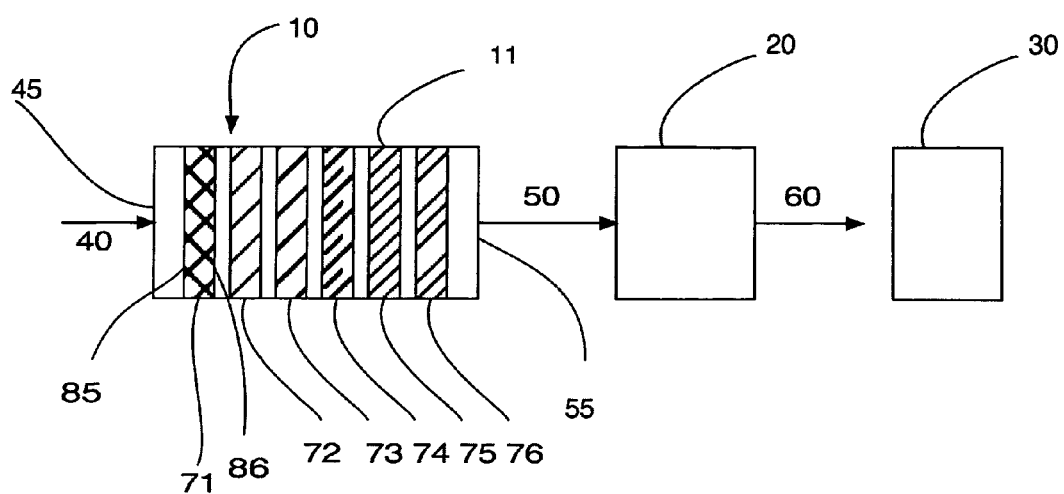
FIG. 1 is a schematic diagram of a system comprising a generic fuel cell depicting an air filter assembly (air contaminant control system) composed of multiple, individually removable/replaceable filtration media cartridges that is used to filter and process incoming ambient air to remove particulate matter and unwanted chemical/biological gases while permitting oxygen to pass through to the cathode side of the fuel cell.

Referring to the figures, wherein like numerals represent like parts throughout the different views, a generic filter assembly (air contaminant control system) 10 is depicted in FIG. 1, together with an assembly of a pump or compressor 20 to enhance introduction of oxygen to the cathode under pressure or at a faster rate than would occur at normal ambient air pressures. The compressor 20 directs the air (oxygen) to the fuel cell stack 30. The filter assembly 10 in the present invention is designed to remove particulate and chemical contaminants from air that is used in equipment 30. Although the present examples refer to uses for fuel cells, this invention holds equal applicability for any air management system where clean air is required, the types and concentrations of contaminants vary widely, and where low cost, ease of maintenance is important.

As depicted in FIG. 1, atmospheric ambient air 40 enters the filter assembly through an inlet 45 (also depicted in FIG. 2), which may be adjusted in size/configuration to affect and optimize the overall rate of dispersion of oxygen (air) across the various filters 71-76. Air entering the inlet typically contains various particulates and chemical liquids/vapors in varying types and concentrations depending on the ambient environment; this air will be referred to herein as contaminated air. The filter assembly 10 is designed to successively remove through various filtration media cartridges 71-76 (consisting of at least two but may be as many as required) the various pollutants contained in the contaminated air, allowing clean air 50 to pass through the outlet 55 of filter assembly 10. Clean air 50 is then directed to the intake for the compressors or pumps that drive the clean air 60 to the cathode of the fuel cell stack 30.

The filter assembly 10 of the present invention has one or more cartridges (as many as required), depicted in FIG. 1 as cartridges 71-76. Each cartridge (as illustrated on cartridge 71) has a contaminated air side 85 and a partially filtered air side 86 (for specific contaminants). The partially filtered air side 86 from the first cartridge 71 is in fluid communication with the contaminated air side of cartridge 72; the improved air side from cartridge 72 is in fluid communication with the contaminated side of cartridge 73, and so on.

A hermetically sealed housing 11 encloses the various filter cartridges, preventing ingress of all air except through the inlet 45, and preventing any fluid transfer around the outer edges of the cartridges 71-76. All air flow passes through the cartridges. The housing 11 may be of different configurations as will be discussed later, but is designed to allow easy and convenient access to the individual cartridges 71-76 contained therein.

Figure 2:
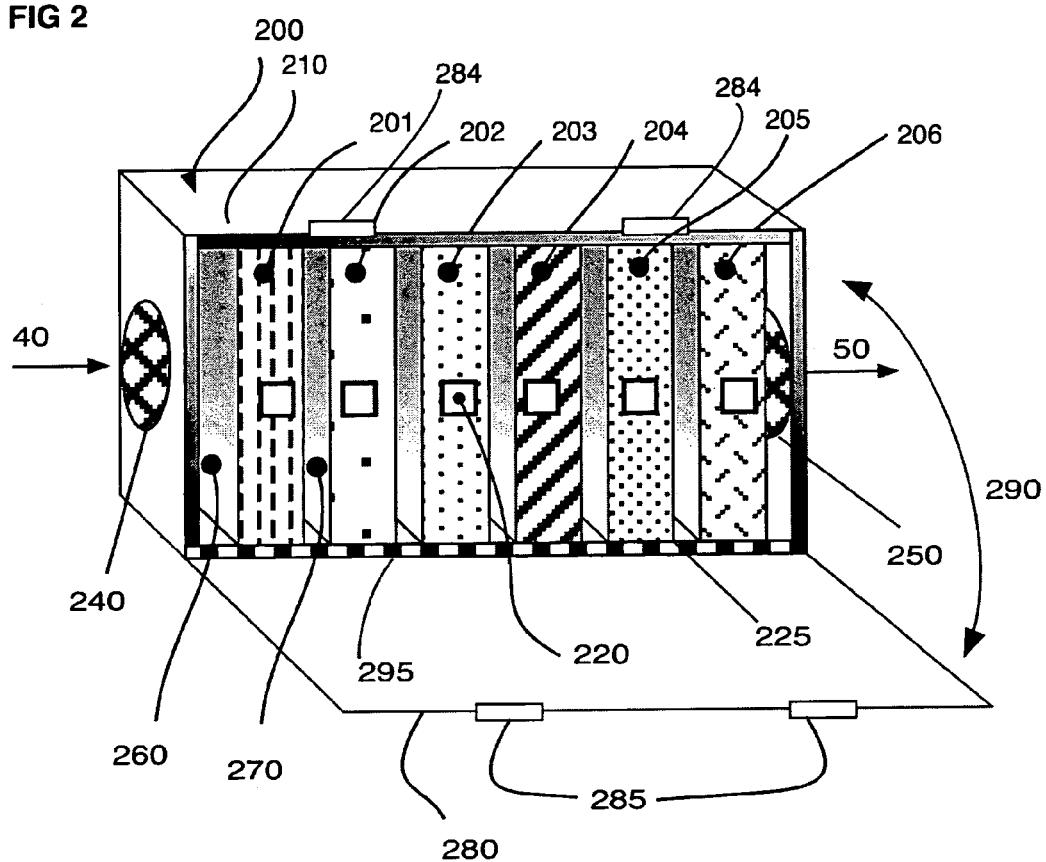
FIG. 2 is a perspective view of one embodiment of the filter assembly in FIG. 1 depicting rectangular individual removable layer cartridges of any particular shape suitable for the fuel cell (i.e., circular, rectangular, square, etc.) containing different filtration media and sealed in an external housing that provides access to the cartridges and has inlet and outlet ports.

A first example of a filter assembly configured according to the principles of this invention is depicted in FIG. 2. As a convention, if an element is exactly the same in design and function as an element found on a previous FIG., then the same numbering will be used. This embodiment (which is simplistically called a "layered" filter assembly) may be scaled in size (length, width, depth) or shape (circular, oval, rectangular) to accommodate filter cartridges 201-206 of different sizes, which are a function of the fuel cell, the air flow rates (which impacts residency time), and specific contaminant concentrations to be removed. At one end of the filter assembly 210 there is an inlet opening 240, which may be of any shape consistent with fluid flow rate requirements and which permits contaminated air to enter. Moreover, special attachments may be required at the inlet to accommodate the specifics of the fuel cell and compressor system interfaces. The other end of the filter assembly 200 is the outlet port 250, which allows clean air to exist and which again may be of any shape consistent with air flow, and which may be mated to unique adaptors associated with mating the assembly with the air pump/compressor (FIG. 1, 20).

The housing 210 may be composed of any material that can be conformed or manufactured with the desired elements, e.g. inlet 240, outlet 250, and slots or retainers for cartridges 201-206. Materials may include, but not be limited to metals, thermoplastic or thermoset polymeric materials, such as polycarbonate, polyethylene, and so on, with or without internal strengthening. Selected materials must not produce any significant off-gassing which might inhibit fuel cell performance. The housing 210 is designed so there is ready access to the filter elements through a removable door or panel 280. The panel can be hinged 295 and swing open 290 to permit access, using hinge locks 284-285 to maintain a tight seal. Alternatively the top could be totally removable by replacing the hinge 295 by additional hinge locks similar to 284-285. Other methods are acceptable as long as they prevent ingress of external air to the housing assembly 210. Finally, the spacing 260 between the inlet and first cartridge 201 and the spacing 270 between the cartridges may be variable depending on flow rate and other conditions.

Within the housing 210, two or more filter elements (cartridges) 201-206 are arranged sequentially so that air flows through each filter element 201-206, starting on the contaminated air side of each, through the filter, exiting filtered air, which in turn enters the next filter element. The sealing system for these cartridges may consist of different methods, from small tolerance slots, to barrier materials. Sealing methods may include compressible materials (such as polyurethane foam) that are attached to all four sides of the individual cartridges, and upon insertion of the cartridges 201-206 forms a tight, robust seal with the walls of the housing 210. The system is designed to provide a seal between the individual filter element 201-206 and the sidewalls, top, and bottom of the housing 210. Seal must be sufficient to prevent unintended levels of unfiltered air from passing around the exterior of the filter cartridge 201-206, thereby forcing air to pass through the cartridges 201-206.

In this embodiment, and in general, the first filter elements will be particulate filter cartridges 201, 202. The largest particulates (such as small animals, leaves, twigs, paper, etc.) will be removed by the screening material over the inlet port 240. A series of particulate filter assemblies (e.g., 201, 202) may be used, with each successive cartridge removing increasingly smaller sized particles. This invention does not specify the precise media used, as it will vary with the target contaminants to be removed. However, typical media include the use of metal mesh, paper or cellulosic materials, nanofibers, or HEPA materials. If required, the filter media may be electrostatically charged to improve efficiency.

Any number of particulate filter elements may be used. The cartridges selected will depend on the type, size, and nature of contaminants to be removed from the ambient air. Moreover, the strength of this invention is that unlike other filtration systems, this system can be rapidly reconfigured with different elements. The selection of the appropriate media will depend on such factors as absorption efficiency, maximum allowable pressure drop, desired air flow rates, and resulting desired contaminant levels.

The remaining filter elements (cartridges) 203-206 are designed to eliminate liquid and/or gaseous chemicals from the air stream. The generic term "adsorb", "adsorption", and "adsorbent" will be used in the following to mean either "adsorption" or "absorption". Furthermore the use of "adsorbent material" or "absorbent material" or variations of these terms is intended to include any material that removes chemical contaminants by either method. Suitable adsorbents may include activated carbon, activated carbon-fibers, activated alumina, molecular sieves, ion-exchange resin, silica gel, alumina, clays, and zeolites. Any of these, or similar materials, may be further impregnated or treated with chemicals that improve the adsorption of specific basic or acidic volatile vapors. In some cases, more than one chemical may be impregnated on the same base media.

The adsorbent materials may come in a variety of forms, generally in particulate form, in granules, beads, fibers, fine powers. In many cases the materials will be used as a bed of loose material encased is a porous cloth or polyester fiber material. Alternatively the materials may also be made into monolithic structures using compression or extrusion techniques to create an almost infinite variety of shapes including solid or perforated disks, cylinders, or honeycomb shaped structures, using suitable, non-reactive binding agents. Finally, these materials may be bonded to a suitable carrier, such as a polyester or metal mesh. This invention does not pertain to the specifics of developing any particular adsorbent structure, but relies on the state-of-the-art to develop suitably specific structures that can be incorporated into the designs offered here.

The adsorbent materials used in the cartridges must be tailored to remove the specific contaminants for the application of the fuel cell. Ambient air contains neutral, acidic and basic liquids and vapors. Acidic gases in ambient air include, but are not limited to sulfur oxides, hydrogen sulfide, hydrogen chloride, and volatile/non-volatile organic acids, and nitrogen oxides. Basic gases include ammonia, amines, amides, sodium hydroxide, volatile organic bases and potassium hydroxides. A variety of materials are commercially available to remove both acidic and basic gases/liquids. This invention was demonstrated using a specific sets of these (Norit's Vapure™ and RBAA1™, etc), but the concept equally applies to other vendors materials.

It must be further noted, that if desired, a physical and chemical adsorption materials may be combined into a single cartridge. The elegance of this invention is that the individual filters/cartridges can be individually tailored for specific use and environments. Should improved materials become available, it is simple to upgrade the entire filter assembly by replacing only a single cartridge—unlike other filtration systems are tightly tailored to a specific environment.

Note that these filter assemblies can be designed (size, shape, configuration, materials) for virtually any potential application, by varying the size of the housing and the sizes of the individual cartridges. However, in doing so air flow resistance must be considered. Further note that each cartridge may contain a Service Life Indicator 220 which provides an easy mechanism for determining when the cartridge is nearly depleted and requires replacement.

As an example, a typical filter assembly configuration in accordance with FIG. 2 that has been shown to be highly effective against ambient diesel and gasoline automotive exhausts might be made in the following way. Filter 201 contains a basic filter to remove large and medium particulates. Filter 202 contains HEPA filter to remove fine particulates. Filter 203 consists of Vaporshell™ 13× molecular sieve adsorbent to remove water/water vapor. Filter 204 consists of Carulite 300™ (manganese dioxide/copper oxide) to remove carbon monoxide (as well as adsorbing other chemicals). Filter 205 contains Norit's Vapur 410™ activated carbon, while filter 206 contains Norit RBAA1™ impregnated activated carbon. Any of these filters can be replaced with alternative filter materials based on the target contaminants—without the necessity to redesign the entire filter assembly.

Figure 3:
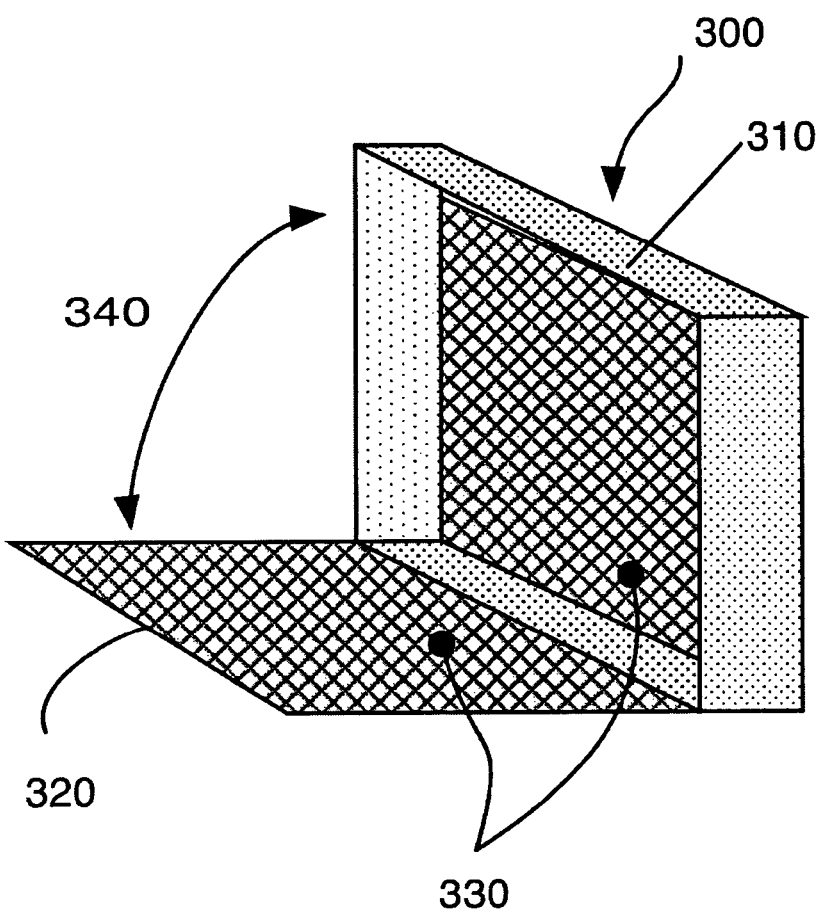
FIG. 3 is an illustration of the individual layered filter sub-assembly (cartridge) used to house the individual filtration media as depicted in FIG. 2.

FIG. 3 illustrates one type of filter sub-assembly (cartridge) 300 that might be used. It consists of a rectangular plastic container 310 into which the active filtration media is placed. The opposite flat faces 330 of the cartridge 300 are fitted with a porous material with openings smaller than the media to be placed within it and sufficiently porous to permit air flow. Although this embodiment of cartridge 300 shows a hinged door 320 that swings open 340 to permit insertion or replacement of filtration media, it does not necessarily have to be this way. The cartridge 300 may be designed so that once the filtration media is inserted it is hermetically sealed and replacement of the media is performed by replacing the entire cartridge, not just the media inside.

Figure 4:
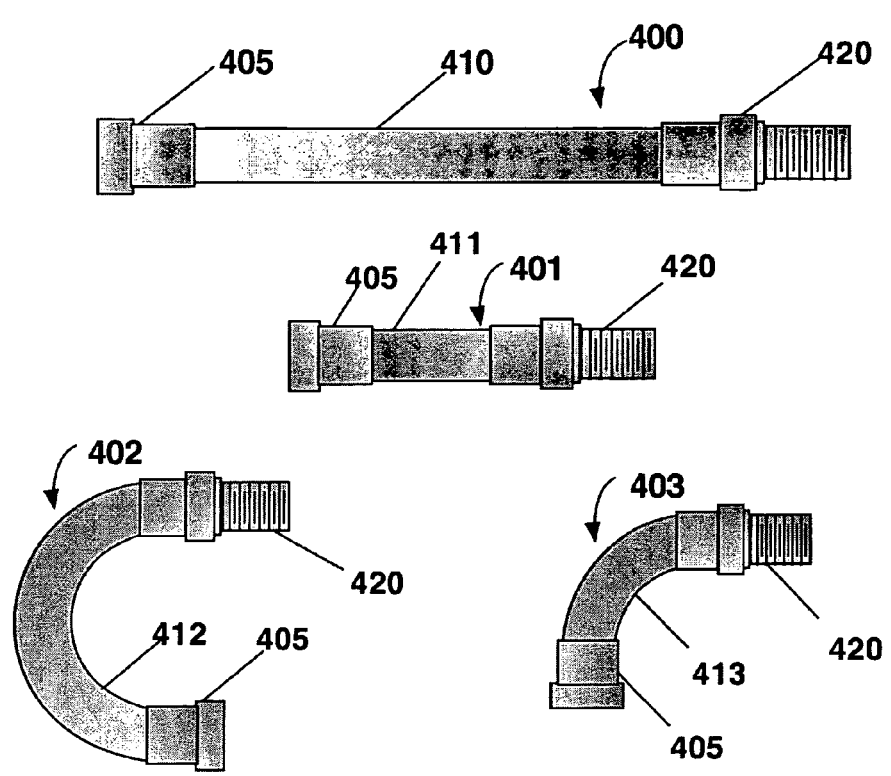
FIG. 4 is an illustration of four different individual tubular filter sub-assemblies (cartridges) used to house the individual filtration media as depicted in FIG. 5.

FIG. 4 is yet another embodiment of this multi-cartridge air contaminant control system concept. Instead of using "layer" cartridges contained in an external housing, this concept uses "tubular" cartridges 400-403 that contain the filtration media and provide the interconnects to attach one cartridge to the next. Each of the cartridges 400-403 illustrated below contain a central core tube 410-13 that contains the filtration media (e.g., activated carbon), sealed at each end by a porous metal or plastic screen or foam. One end of each representative configuration contains a threaded female connector 405; the opposite end contains a male threaded connector 420. The connector 405 is of same thread count and pitch as 420, allowing them to mate easily. In this particular embodiment the materials are ½" copper tubing and fittings, however, any material may be used, so long as it is not reactive with the filtration materials. Alternative materials might include PVC piping, flexible plastic hoses, and steel or brass tubing. Moreover, the length and diameter of these "tubular" cartridges is flexible in both length and diameter. The size is dictated by the quantity of the filtration media contained, which is dependent upon the contaminants to be removed, their concentration, desired effectiveness, and the required residency times/flow rates. FIG. 4 illustrates four different configurations—a long tubular cartridge 400, a short cartridge 401, a 180 deg curved ("U") cartridge 402, and 90 deg curved cartridge 403. As will be seen in FIGS. 5 and 6, this permits a wide variety of configurations that may be tailored to the individual fuel cell design.

Figure 5:
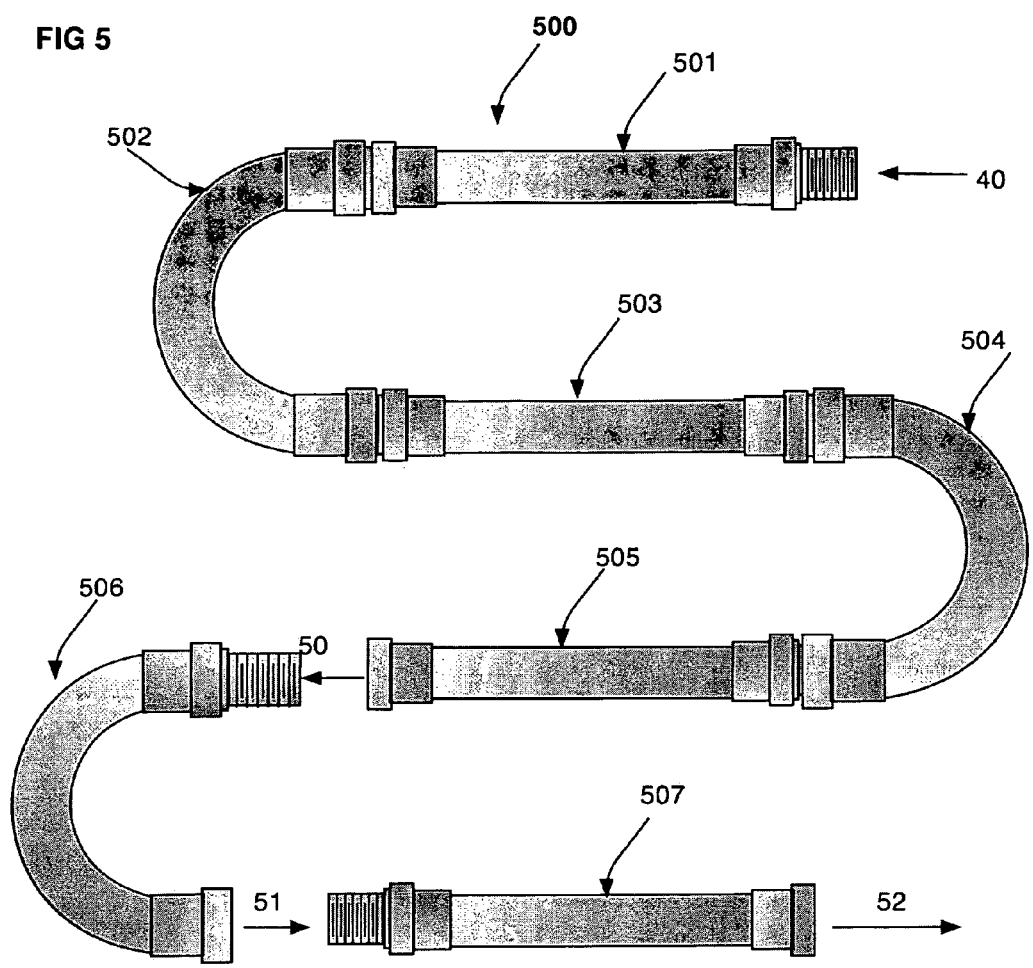
FIG. 5 is a perspective view of a second embodiment of the tubular filter assembly in FIG. 1 based on individual tubular cartridges, depicted in one potential serpentine configuration, and illustrating how additional cartridges (tubes) may be incorporated.

FIG. 5 illustrates yet another embodiment of the filter assembly using the cartridges in FIG. 4. The overall filter assembly 500 consists of five individual tubular cartridges 501-505 containing different filtration media connected using the threaded connectors (or other suitable method) in a "serpentine" fashion. Contaminated air 40 flows in one end, through each of the sub-assemblies (cartridges) in succession, thereby removing the respective contaminants, with clean air 50 exiting. This design also allows the filter to be "folded" (much like the tube on a trumpet) to minimize space without loss of effectiveness. The individual tubular cartridges can easily be replaced by unscrewing the spent cartridge and replacing it with another. Moreover, additional cartridges 506-507 can be easily added to handle other contaminants if required, which then further scrub pollutants to produce increasingly clean air 51-52.

Figure 6:
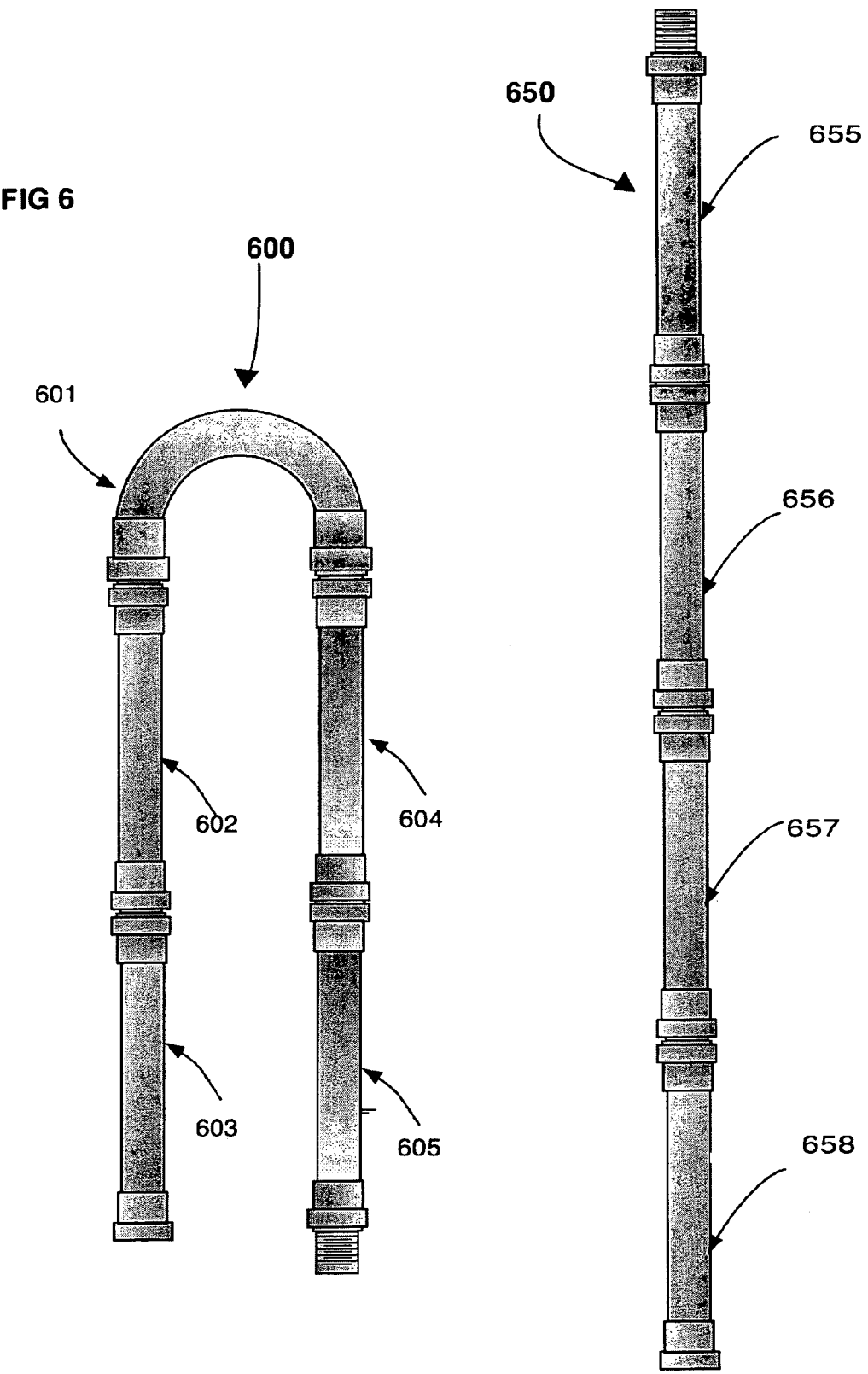
FIG. 6 is an illustration of two additional configurations of air contaminant control systems that might be constructed using the individual sub-assemblies (cartridges) from FIG. 5.

FIG. 6 illustrates two alternative embodiments of this air contaminant control system concept, using the same basic principles shown in FIGS. 4 and 5. In filter assembly 600 five separate cartridges 601-605 are arranged in a "U" shape vice serpentine. In filter assembly 650, four cartridges 655-658 are arranged in a "linear" shape. This simply demonstrates the flexibility of this air contaminant control system. It is easy to adapt to a variety of applications where integration, size, configuration are important—without having to change the basic modules (cartridges) being used. As noted earlier, cartridges 601-605, 655-58 may be made of a variety of materials and in almost any configuration (e.g., length and diameter).

Figure 7:
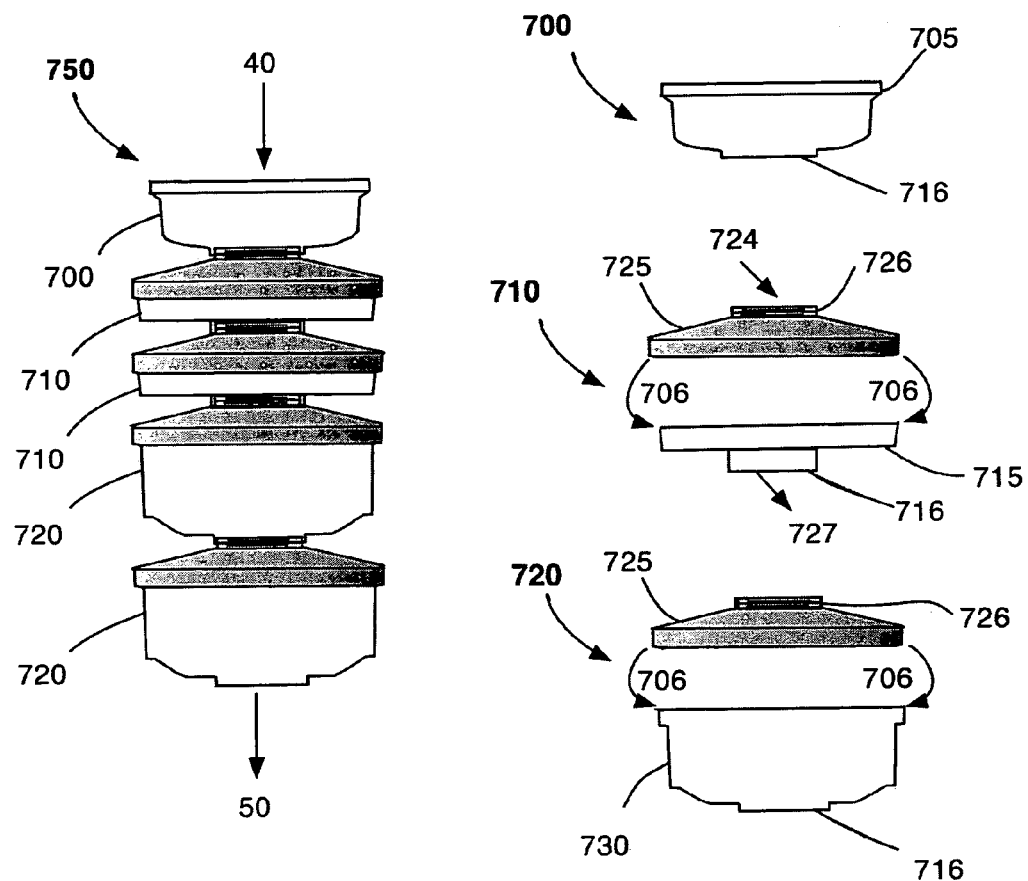
FIG. 7 is a perspective view of a third embodiment of the filter assembly in FIG. 1 based on individual commercial respiratory cartridges, complemented by a newly designed supplemental filtration cartridge for filtration media not readily available from commercial respirators.

FIG. 7 illustrates yet another embodiment of this concept. In this case no external housing is used. Rather the individual cartridges are screwed together using standard commercial respirator materials. One or more of the particulate filtration media 700 (commercial North P100™ HEPA filter) with an open face and a threaded bottom may be used. Other commercial respirator filters 730 may be used to eliminate specific contaminants (acid gases, ammonia/amine, organic vapors, etc). A commercial rubber "cap" 725, which has a threaded opening 726 on the top is snapped 706 over the commercial filter 730 to create a cartridge that can be threaded to others. For those contaminants for which a commercial respirator filter is unavailable, a commercially available rubber "cap" 725, containing a threaded opening 726 on the top is snapped 706 over a base 715 containing a threaded bottom 716. Filtration media is placed on 715 and covered by the rubber top 725. Screening materials are placed at the inlet 724 and exit 727 to contain the filtration media.

The full filter assembly 750 is then constructed of at least one particulate filter (such as the HEPA filter 700); one or more cartridges prepared using commercial base 715 and cover 725 with individual selected filtration media (e.g., Vapur™, RBAA1™, Carulite™, VaporShell™ for chemical adsorption and water/CO management); and one or more commercially available cartridges 720. The advantage of this system is that it can be rapidly constructed using predominantly commercial components, yet easily modified using cartridges 710 constructed with special filtration media. Its principal disadvantage is it limited flexibility in size and shape.

The earlier discussions, descriptions, and examples provide broad examples of filter assemblies/sub-assemblies that might be used in this multi-cartridge air contaminant control system. Although the significant advantages of this rapidly configurable, cost effective, and highly effective filtration assembly concept have been described, demonstrated, and illustrated, this description is illustrative only, and that any number of different methods may be used, including but not limited to the size and shape of the cartridges, the methods for enclosing them or attaching them to one another. Changes may be made in detail, especially in matters of shape, size and arrangement of parts and types of materials within the principles of the disclosure to the full extent indicated by the broad general meaning of the terms in which the appended claims are expressed.

What is claimed:

1. A fuel cell cathode air filter assembly or air contaminant control system comprising:
   an intake port that collects ambient air and directs it into the filter assembly;
   a filter housing comprising a plurality of retainers and a removable panel that permits access to the filter housing;
   a filter assembly comprising a plurality of individually configurable and separately removable filter cartridges arranged within the filter housing, wherein each filter cartridge fits within one of the retainers of the filter housing, and wherein each filter cartridge is surrounded by a compressible material; and
   an outlet port assembly that connects to the oxidant intake port of the fuel cell or other device that requires clean ambient air.

2. The fuel cell cathode air filter assembly according to claim 1, wherein the filter assembly is constructed and configured for the fuel cell so that gaseous oxidant stream enters the intake port, passes through the filter assembly, passes through the individual cartridges sequentially within the filter assembly, and exits at outlet port.

3. The fuel cell cathode air filter assembly according to claim 2, wherein the gaseous oxidant stream is ambient air.

4. The fuel cell cathode air filter assembly according to claim 1, wherein the filter assembly is constructed and configured such that no external air ingress is permitted and where no gases are permitted to escape around the cartridges without passing through the filtration cartridges.

5. The fuel cell cathode air filter assembly according to claim 1, wherein the filter assembly further comprises: one or more chemical adsorbent filter cartridges selected for removal of specific contaminants and one or more filter cartridges comprising a water management system.

6. The fuel cell cathode air filter assembly according to claim 5, wherein the one or more chemical adsorption filter cartridges comprise at least one of the following materials: molecular sieves, activated carbon, activated alumina, ion exchange resins, silica gel, diatomaceous earths, clays, and zeolites.

7. The fuel cell cathode air filter assembly according to claim 6, wherein, when the one or more chemical adsorption filter cartridges comprise a plurality of chemical adsorption filters, each chemical adsorption filtration cartridge has different origin materials, particle size, particle shapes, effective pore sizes in order to be optimized to remove specific chemicals.

8. The fuel cell cathode air filter assembly according to claim 7, wherein an absorption amount associated with each of the chemical adsorption filtration cartridges varies to provide different adsorbent capabilities based on the contaminants in the ambient air to allow individual cartridges containing different amounts of media material to be inserted.

9. The fuel cell cathode air filter assembly according to claim 7, wherein at least one of the plurality of chemical adsorbent filtration cartridges is coated or impregnated with various chemicals to optimize selective adsorption or elimination of specific chemicals.

10. The fuel cell cathode air filter assembly according to claim 5, wherein each of the plurality of configurable and separately removable filter cartridges contain a useful service life indicator that indicates an extent to which a filter cartridge's adsorption capabilities have been depleted.

11. The fuel cell cathode air filter assembly according to claim 1, wherein each filter cartridge comprises at least one of the following materials: metallic mesh, cellulosic fibers, cloth fibers, polymeric materials, and high efficiency particulate arrestance (HEPA) media, and wherein each material is selected based on particulate sizes to be removed and desired air flow rates.

12. The fuel cell cathode air filter assembly according to claim 11, wherein each filter cartridge's shape and size is determined by the amounts of filtration media necessary to remove target contaminants to acceptable levels and the volume of ambient air to be purified.

13. The fuel cell cathode air filter assembly according to claim 12, where the filter cartridges' shapes are selected from the group comprising: square, rectangular, oval, circular, and tubular, and the sizes are selected from the group comprising: width, length, diameter, and depth.

14. The fuel cell cathode air filter assembly according to claim 1, wherein the filter assembly is constructed and configured for the fuel cell so that gaseous oxidant stream enters the intake port, passes through the filter assembly, passes through the plurality of individually configurable and separately removable cartridges sequentially within the filter assembly, and exits at outlet port.

15. The fuel cell cathode air filter assembly according to claim 14, wherein the filter assembly is constructed and configured such that no external air ingress is permitted and where no gases are permitted to escape around the cartridges without passing through the filtration cartridges.

16. An air contaminant control system comprising:
intake port means for collecting ambient air and directing it into a filter assembly, wherein the filter assembly comprises a plurality of individually configurable and separately removable cartridges attached directly;
filter housing means, comprising a plurality of retainers wherein each of the plurality of cartridges fits within one of the plurality of retainers, wherein each of the retainers is in contact with at least one other of the plurality of retainers, wherein each cartridge is surrounded by a compressible material; and
outlet port means for connecting the filter assembly to an oxidant intake port of a fuel cell or other device that requires clean ambient air.

17. A method for constructing a fuel cell cathode air filter assembly, the method comprising the steps of:
attaching a filter assembly to an air intake port, the filter assembly comprising a plurality of individually configurable and separately removable filter cartridges arranged within a filter housing comprising a plurality of retainers and a removable panel that permits access to the filter housing, wherein each cartridge fits within one of the retainers of the filter housing and wherein each filter cartridge is surrounded by a compressible material attaching the filter assembly to an oxidant intake port of a fuel cell or other device that requires clean ambient air; and
replacing at least one of the plurality of individually configurable and separately removable filter cartridges when a service life indicator associated with the at least one of the plurality of filter cartridges indicates that the cartridge requires replacement.

18. The method of claim 17, wherein the filter assembly is constructed and configured for the fuel cell so that gaseous oxidant stream enters the intake port, passes through the filter assembly, passes through the plurality of individually configurable and separately removable filter cartridges sequentially within the filter assembly, and exits at outlet port.

19. The method of claim 17, wherein the filter assembly is constructed and configured such that no external air ingress is permitted and where no gases are permitted to escape around the filter cartridges without passing through the filtration cartridges.

20. The method of claim 17, wherein the filter assembly further comprises: one or more chemical adsorbent filter cartridges selected for removal of specific contaminants and one or more filter cartridges comprising a water management system.

\* \* \* \* \*